United States Patent
Sandgren (10) Patent No.: US 10,469,537 B2
(45) Date of Patent: Nov. 5, 2019

(54) HIGH AVAILABILITY TAKE OVER FOR IN-DIALOG COMMUNICATION SESSIONS

(71) Applicant: Avaya Inc., Santa Clara, CA (US)

(72) Inventor: Thorsten Ohrstrom Sandgren, Thornton, CO (US)

(73) Assignee: Avaya Inc., Santa Clara, CA (US)

( * ) Notice: Subject to any disclaimer, the term of this patent is extended or adjusted under 35 U.S.C. 154(b) by 676 days.

(21) Appl. No.: 14/872,496

(22) Filed: Oct. 1, 2015

(65) Prior Publication Data

US 2017/0099323 A1    Apr. 6, 2017

(51) Int. Cl.
G06F 15/16     (2006.01)
H04L 29/06     (2006.01)

(52) U.S. Cl.
CPC ............... H04L 65/1006 (2013.01)

(58) Field of Classification Search
CPC ........... H04L 65/1006; H04L 65/1069; H04L 65/1016; H04L 47/746; H04L 47/762; H04L 67/103; H04L 67/2861; H04L 67/1034; H04L 69/40; H04L 45/06; H04L 45/28; H04L 41/0654; H04L 49/557; H04M 7/006; H04W 4/16; G06F 11/16; G06F 11/14; G06F 11/202; G06F 9/455
USPC ................. 709/223, 224, 227, 228
See application file for complete search history.

(56) References Cited

U.S. PATENT DOCUMENTS

| | | | | |
|---|---|---|---|---|
| 6,304,980 B1* | 10/2001 | Beardsley | ........... | G06F 11/2064 707/999.202 |
| 7,948,870 B1* | 5/2011 | Rijsman | ................. | H04L 45/00 370/216 |
| 8,018,956 B1* | 9/2011 | Deng | ..................... | H04L 1/187 370/401 |
| 9,100,236 B1* | 8/2015 | Shetty | ..................... | H04L 29/06 |
| 10,097,367 B2* | 10/2018 | Ansari | .................. | G06Q 30/04 |
| 2004/0117438 A1* | 6/2004 | Considine | ........... | G06F 11/2074 709/203 |
| 2005/0058125 A1* | 3/2005 | Mutikainen | ....... | H04L 29/12292 370/354 |

(Continued)

OTHER PUBLICATIONS

Rosenberg et al., "Section_21-4-18_480_Temporarily_Unavailable," The Internet Society, 2002, retrieved from https://tools.ietf.org/html/rfc3261#section-21.4.18, retrieved on Apr. 18, 2016, 1 page.

(Continued)

*Primary Examiner* — Thu Ha T Nguyen
(74) *Attorney, Agent, or Firm* — Sheridan Ross P.C.

(57) ABSTRACT

When a communication session is established, a primary sequenced application is sequenced into the communication session. At some point, the primary sequenced application fails. Before the communication session has been reestablished, an in-dialog message is received for the first communication session. In response to determining that the primary sequenced application has failed and receiving the in-dialog message for the first communication session, reestablishment of the first communication session is expedited to a backup sequenced application. The communication session is reestablished. This allows a communication session that was normally going to be dropped to stay established, thus providing higher reliability over current systems.

20 Claims, 3 Drawing Sheets

(56) References Cited

U.S. PATENT DOCUMENTS

| | | | | |
|---|---|---|---|---|
| 2006/0153068 A1* | 7/2006 | Dally | H04L 1/22 | 370/219 |
| 2006/0294241 A1* | 12/2006 | Cherian | H04L 67/14 | 709/227 |
| 2006/0294245 A1* | 12/2006 | Raguparan | H04L 29/06027 | 709/227 |
| 2007/0220302 A1* | 9/2007 | Cline | G06F 11/2035 | 714/4.1 |
| 2008/0165789 A1* | 7/2008 | Ansari | G06Q 30/04 | 370/401 |
| 2009/0019094 A1* | 1/2009 | Lashley | G06F 9/5027 | |
| 2009/0067441 A1* | 3/2009 | Ansari | H04L 12/2814 | 370/401 |
| 2009/0129296 A1* | 5/2009 | Grinshpun | H04W 36/026 | 370/261 |
| 2009/0168787 A1* | 7/2009 | Ansari | H04L 12/66 | 370/401 |
| 2009/0196183 A1* | 8/2009 | Kakadia | H04L 12/14 | 370/237 |
| 2011/0122863 A1* | 5/2011 | Balasaygun | H04M 15/00 | 370/352 |
| 2011/0264746 A1* | 10/2011 | Yin | H04L 69/28 | 709/206 |
| 2012/0042084 A1* | 2/2012 | Dutta | H04L 65/1016 | 709/228 |
| 2013/0036189 A1* | 2/2013 | Stevens, III | H04L 65/1006 | 709/217 |
| 2013/0259026 A1* | 10/2013 | Ross | H04L 65/1069 | 370/352 |
| 2013/0275695 A1* | 10/2013 | Ponsford | G06F 11/1448 | 711/162 |
| 2014/0047122 A1* | 2/2014 | Haserodt | H04L 69/40 | 709/228 |
| 2014/0089457 A1 | 3/2014 | Ohrstrom-Sandgren et al. | | |
| 2014/0089915 A1 | 3/2014 | Haserodt et al. | | |
| 2014/0095723 A1* | 4/2014 | Ezell | H04L 67/141 | 709/227 |
| 2014/0101322 A1* | 4/2014 | Nissim | H04L 65/1006 | 709/227 |
| 2014/0214972 A1* | 7/2014 | Nemani | H04L 65/1006 | 709/206 |
| 2014/0289303 A1* | 9/2014 | Tarricone | H04L 67/10 | 709/201 |
| 2014/0359340 A1* | 12/2014 | Hua | G06F 11/2023 | 714/4.11 |
| 2015/0039775 A1* | 2/2015 | Benner | H04L 65/1006 | 709/228 |
| 2015/0347683 A1* | 12/2015 | Ansari | H04L 63/08 | 726/7 |
| 2016/0062854 A1* | 3/2016 | Allen | H04L 67/1097 | 714/4.11 |
| 2016/0134666 A1* | 5/2016 | Ethier | H04L 65/403 | 709/204 |
| 2016/0270128 A1* | 9/2016 | Biage | H04W 4/90 | |
| 2016/0330108 A1* | 11/2016 | Gillon | H04L 69/40 | |
| 2017/0060708 A1* | 3/2017 | Narang | G06F 11/2033 | |
| 2017/0099323 A1* | 4/2017 | Sandgren | H04L 65/1006 | |
| 2017/0139727 A1* | 5/2017 | Combellas | G06F 8/65 | |
| 2017/0237668 A1* | 8/2017 | Hall | H04L 29/06 | 370/235 |
| 2018/0054468 A1* | 2/2018 | Whynot | H04L 65/1006 | |

OTHER PUBLICATIONS

Rosenberg et al., "Section_21-4-27_491_Request_Pending," The Internet Society, 2002, retrieved from https://tools.ietf.org/html/rfc3261#section-21.4.27, retrieved on Apr. 18, 2016, 1 page.

\* cited by examiner

HIGH AVAILABILITY TAKE OVER FOR IN-DIALOG COMMUNICATION SESSIONS

TECHNICAL FIELD

The systems and methods disclosed herein relate to communication systems and in particular to high availability communication systems.

BACKGROUND

Existing communication systems provide the ability to sequence in an application to monitor a communication session. For example, the signaling channel of a communication session may have a sequenced application to provide unique services that have been identified for a particular user, such as to provide a user the ability to selectively screen calls while on another call.

As more and more sequenced applications are being used in communication systems, the need for reliable communications becomes more pronounced. Nowadays, a sequenced application may be handling hundreds of communication session at one time. If the sequenced application fails, this can result in a large number of communication sessions being dropped.

To overcome this issue, systems have been developed to failover to a backup sequenced application when a primary sequenced application fails. For example, if a primary sequenced application fails, a backup sequenced application may be selected to take over the existing communication sessions of the failed sequenced application. However, a problem exists during the time when the backup sequenced application takes over from the failed communication session. If an in-dialog message is received for one of the communication sessions during this time, the communication session is dropped because the backup sequenced application has not reestablished this particular communication session.

BRIEF SUMMARY

Systems and methods are provided to solve these and other problems and disadvantages of the prior art. When a communication session is established, a primary sequenced application is sequenced into the communication session. At some point, the primary sequenced application fails. Before the communication session has been reestablished, an in-dialog message is received for the first communication session. In response to determining that the primary sequenced application has failed and receiving the in-dialog message for the first communication session, reestablishment of the first communication session is expedited to a backup sequenced application. The communication session is reestablished. This allows a communication session that was normally going to be dropped to stay established, thus providing higher reliability over current systems.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

DETAILED DESCRIPTION

Figure 1:
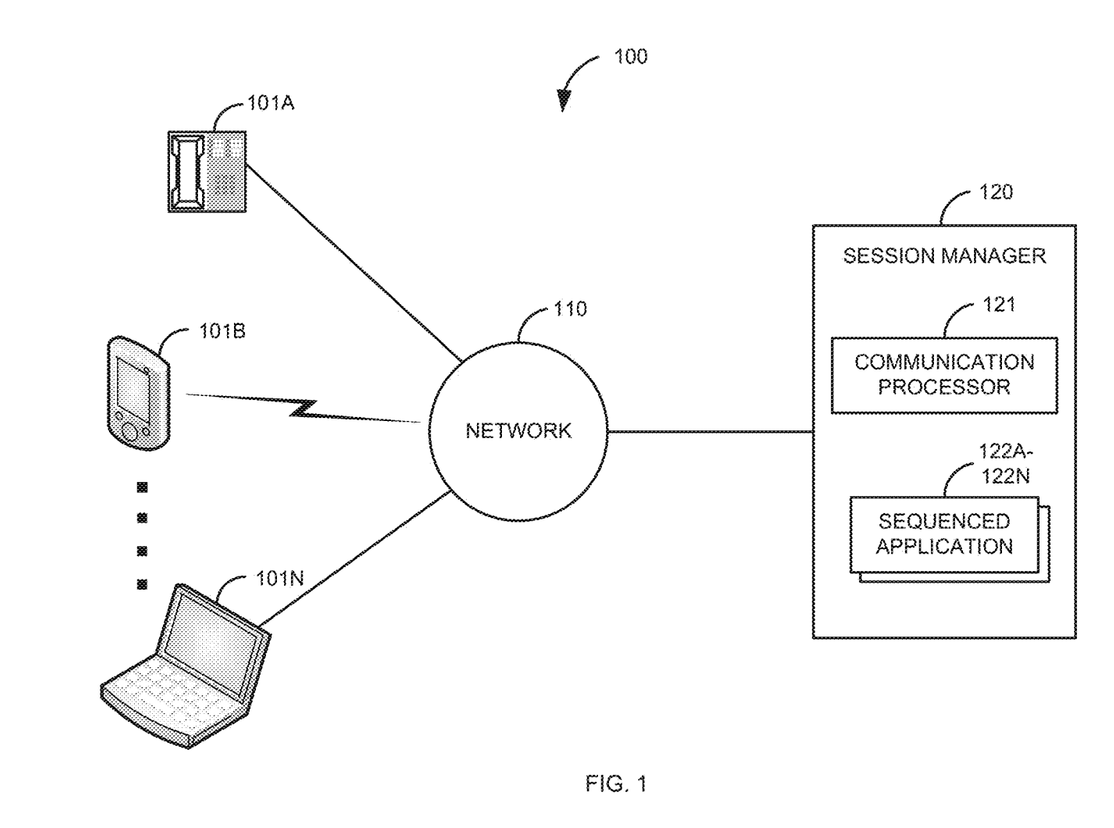
FIG. 1 is a block diagram of a first illustrative system for high availability for sequenced applications.

FIG. 1 is a block diagram of a first illustrative system 100 for high availability for sequenced applications 122. The first illustrative system comprises communication devices 101A-101N, a network 110, and a session manager 120.

The communication device 101 can be or may include any device that can communicate on the network 110, such as a Personal Computer (PC), a telephone, a video system, a cellular telephone, a Personal Digital Assistant (PDA), a tablet device, a notebook device, a smart phone, a contact center, a Interactive Voice Response (IVR) system, a mixer, a video switch, a conferencing application, and/or the like. As shown in FIG. 1, any number of communication devices 101A-101N may be connected to the network 110. In addition, the communication device 101 may be directly connected to the session manager 120. The communication devices 101A-101N are typically communication endpoints. However, in some embodiments the communication device 101 may not be a communication endpoint, such as a conference bridge or video switch.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), and the like. Thus, the network 110 is an electronic communication network configured to carry messages via packets and/or circuit switched communications.

The session manager 120 can be or may include any hardware coupled with software that can manage communication sessions, such as a Private Branch Exchange (PBX), a video switch, an Instant Messaging (IM) server, a central office switch, a router, a communication manager, and/or the like. The session manager 120 further comprises a communication processor 121 and sequenced applications 122A-122N.

The communication processor 121 can be any hardware processor coupled with software that can process various types of communications, such as a microprocessor, a Digital Signaling Processor (DSP), a microcontroller, an application specific processor, and/or the like. The communication processor 121 can process one or more protocols, such as Session Initiation Protocol (SIP) Web Real-Time Communication (WebRTC), H.323, video protocols, IM protocols, email protocols, and/or the like.

The sequenced applications 122A-122N can be any type of application that is sequenced into the communication path and/or media path of a communication session. The sequenced applications 122A-122N can provide a variety of services for a variety of different types of communication sessions (e.g., voice, video, IM etc.). For example, the sequenced application 122 may be a call screening application, a call forking application, a voice translation application, a video call screening application, and/or the like. The sequenced application 122 may support different protocols, such as SIP, WebRTC, H.323, video protocols, IM protocols, and/or the like. The sequenced application 122 may be implemented as a Back-to-Back User Agent (B2BUA) using the SIP protocol.

The sequenced applications 122A-122N may include a primary sequenced application 122 and one or more backup sequenced applications 122. The backup sequenced application 122 may be actively handling other communication sessions or may be not be currently handling active communication sessions until a failover condition occurs. Alternatively, the sequenced applications 122A-122N may represent different sequenced applications 122 that each has at least one or more backup sequenced applications 122.

A sequenced application 122 is typically sequenced for a communication session based on a user or administrative configuration. For example, a user may define that a recording application be sequenced every time a call is received from a specific individual or phone number. The sequenced application 122 is typically sequenced by the session manager 120. For example, when a communication message from the communication device 101A is received by the session manager 120 (e.g., a SIP INVITE), the session manager 120 routes the message to the sequenced application 122. The sequenced application 122 then routes the message back to the session manager 120. The session manager 120 in turn sends the message to the communication device 101N.

In some embodiments multiple sequenced applications 122 may be sequenced into a communication session. For example, a calling party may sequence a sequenced application 122 and the called party may sequence a sequenced application 122.

The sequenced application 122 may be developed based on a Software Development Kit (SDK). The SDK includes a module that manages the process described later on in FIG. 3 on behalf of a developer of the sequenced application 122. A developer may port the SKD and provide services unique to the sequenced application 122.

In one embodiment, some, or all of the sequenced applications 122A-122N may be separate from the session manager 120. For example, the sequence applications 122A-122N may reside on a separate application server.

Figure 2:
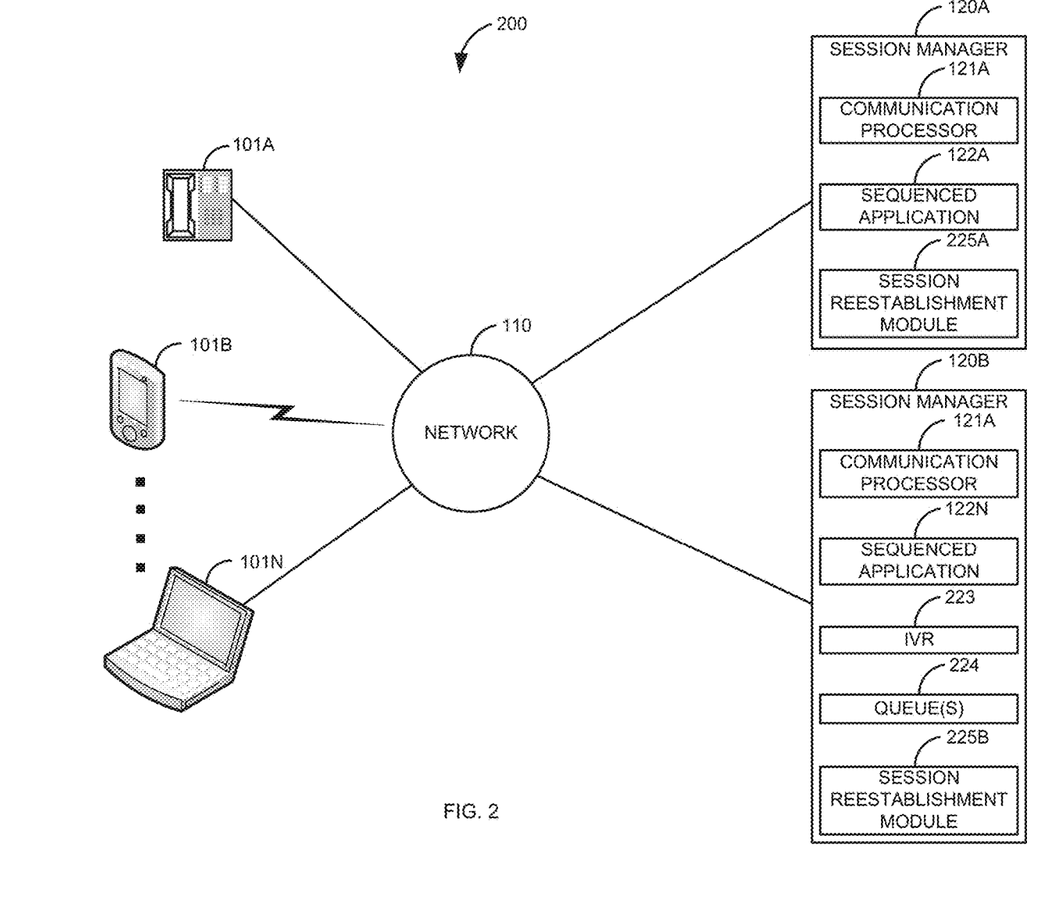
FIG. 2 is a block diagram of a second illustrative system for high availability of distributed sequenced applications.

FIG. 2 is a block diagram of a second illustrative system 200 for high availability of distributed sequenced applications 122. The second illustrative system 200 comprises the communication devices 101A-101N, the network 110, and session managers 120A-120B.

The session manager 120A comprises the communication processor 121A the sequenced application 122A, and a session reestablishment module 225A. The session manager 120B comprises a communication processor 121B, the sequenced application 122N, an Interactive Voice Response (IVR) system 223, a queue(s) 224, and a session reestablishment module 225B. The second illustrative system 200 is an exemplary embodiment of a system where the primary sequenced application 122A resides on the session manager 120A and the backup sequenced application 122N resides on a second session manger 120B. The system of FIG. 2 may also have multiple different sequenced applications 122 along with the respective sequenced application 122 on a different session manager 120.

The IVR system 223 can be or may include any hardware/software that can provide voice menus to a user. The IVR system 223 may be one of the communication devices of a communication session. The queue(s) 224 may be any hardware/software that is used to hold calls. For example, the queues 224 may be contact center queues 224 for holding call that are waiting to be serviced by a contact center agent. The queue 224 may be the communication device 101 that is involved in the communication session.

The session reestablishment module 225 can be or may include any hardware/software that is a common process for use by sequenced applications 122 to manage failover of sequenced application 122. Each sequenced application 122 calls the session reestablishment module to expedite transfer of a filed sequenced application 122.

Figure 3:
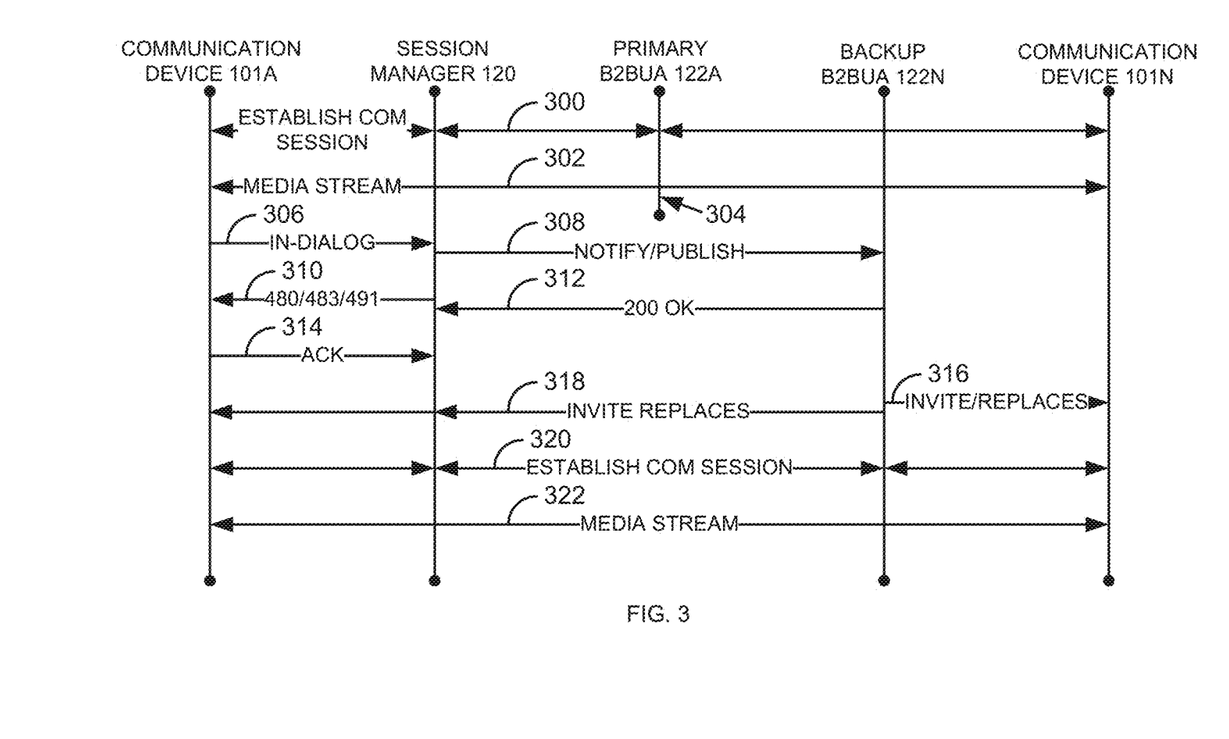
FIG. 3 is a flow diagram of a process for high availability for sequenced applications.

FIG. 3 is a flow diagram of a process for high availability for sequenced applications 122. Illustratively, the communication devices 101A-101N, the session manager 120, the communication processor 121, the sequenced applications 122A-122N, the IVR system 223 the queue(s) 224, and the session reestablishment modules 225A-225B are stored-program-controlled entities, such as a computer or processor, which performs the method of FIG. 3 and the processes described herein by executing program instructions stored in a computer readable storage medium, such as a memory or disk. Although the methods described in FIG. 3 are shown in a specific order, one of skill in the art would recognize that the steps in FIG. 3 may be implemented in different orders and/or be implemented in a multi-threaded environment. Moreover, various steps may be omitted or added based on implementation.

FIG. 3 is an exemplary embodiment that is described using the SIP protocol. However, the process of FIG. 3 is not unique to SIP and may be implemented using other protocols, such as WebRTC, H.323, video protocols, and/or the like. For example, the process of FIG. 3 may be implemented using WebRTC messaging in place of SIP messaging. In FIG. 3, Back-to-Back User Agents (B2BUAs) 122A and 122N are used as exemplary sequenced applications 122.

The process of FIG. 3 will work with any of the embodiments described in FIGS. 1-2. Although the process of FIG. 3 is described where there is a single session manager 120, the process will work equally well where the primary sequenced application 122A (e.g., a B2BUA) is on a different session manager 120 than the backup sequenced application 122N.

The process of FIG. 3 shows the main messages that are used to highlight the various embodiments. In some cases, well known messages are not shown for simplicity. For example, the establishment of the communication session in step 300 is shown as a single step.

The process of FIG. 3 is described where there are two communication devices 101A and 101N are involved in the communication session. The process of FIG. 3 is not limited to a communication session between two communication devices 101. For example, the process of FIG. 3 may for a conferenced communication session that includes three or more communication devices 101.

The process starts in step 300 of where SIP communication session is established using known SIP messaging. The established communication session may be a voice communication session, a video communication session, an IM communication session, a conferenced communication session, and/or the like. The established SIP communication session is established with a primary B2BUA 122A that has been sequenced into the signaling channel of the communication session. In this exemplary embodiment, the session manager 120 is shown as being in the communication path between the communication device 101A and the primary B2BUA 122A. Although not shown for simplicity, the flow of messages between the primary B2BUA 122A (and also the backup B2BUA 122N) and the communication device 101N would also flow through the session manager 120.

Once the SIP communication session is established in step 300, a media stream for the communication session is established directly between the communication device 101A and the communication device 101N in step 302. For example, a voice communication stream using Real-Time Protocol (RTP)/Session Description Protocol (SDP) may be established in step 302. In FIG. 3, the media stream does not flow through the primary B2BUA 122A. However, in some embodiments, the media stream may also flow through the primary B2BUA 122A. For example, if the primary B2BUA 122A was a recording application, the media stream would flow through the primary B2BUA 122A in step 302.

At some point in time during the communication session, the primary B2BUA 122A fails in step 304. The primary B2BUA 122A may fail for various reasons, such as a software failure, a hardware failure (e.g., where a session manager 120A of FIG. 2 fails), a network 110 failure, and/or the like. The session manager 120 determines that the primary B2BUA 122A has failed in step 304. The session manager 120 can determine that the primary B2BUA 122A has failed in various ways, such as being notified, not receiving a response from the primary B2BUA 122A, and/or the like.

Just after the failure of the primary B2BUA 122A in step 304, the communication device 101A sends an in-dialog message to the session manager 120 in step 306. A SIP in-dialog message is any message that has both the To: tag and the From: tag populated as defined in SIP RFC 3261, Internet Society, June, 2002, which is incorporated herein by reference. For example, a SIP INVITE with only the From: tag populated would not be considered a in-dialog message. Alternatively, a SIP in-dialog message would include a SIP re-INVITE, a SIP INVITE/HOLD, a SIP RINGING, a SIP PRAK, a SIP NOTIFY, a SIP REFER, a SIP UPDATE, a SIP MESSAGE, a SIP 200 OK, a SIP ACK and/or the like. For example, the user of the communication device 101A may have pushed a button to put a voice call on hold, which results in a SIP INVITE/HOLD in-dialog message being sent in step 306.

In response to determining that the B2BUA 122A has failed (step 304) and receiving the SIP in-dialog message (step 306), the session manager 120 expedites reestablishment of the communication session (established in step 300) to the backup B2BUA 122N. To expedite the reestablishment of the communication session, the session manager 120 sends a SIP NOTIFY or a SIP PUBLISH message to the backup B2BUA 122N in step 308. The SIP NOTIFY or SIP PUBLISH message of step 308 instructs the backup B2BUA 122N to reestablish the communication session. The backup B2BUA 122N responds to the SIP NOTIFY or SIP PUBLISH message of step 308 with a SIP 200 OK in step 312.

In addition, the session manager 120 sends, in step 310, a SIP message that is one of a SIP 480 Temporarily Unavailable message, a SIP 404 Not Found, a SIP 413 Request Entity Too Large, a SIP 486 Busy Here, a SIP 600 Busy, a SIP 603 Decline, or a SIP 491 Request Pending message in response to the in-dialog message of step 306. The purpose of the message sent in step 310 is to delay the communication device 101A from tearing down the communication session before the communication session can be reestablished on the backup B2BUA 122N.

The message sent in step 310 can vary based on the type of in-dialog message received in step 306. For example, if the in-dialog message is a SIP INVITE message (e.g., a SIP INVITE/HOLD message), the response message sent in step 310 may be the SIP 491 Request Pending message. If the in-dialog message is a non-SIP INVITE message (e.g., a SIP OPTIONS message), the message of step 310 may be the SIP 480 Temporarily Unavailable message. Alternatively, one of the SIP 480, 404, 413, 486, 600, 603, and 491 messages may be sent for all of the in-dialog messages of step 306. In response to the message of step 310, the communication device 101A responds with a SIP ACK message in step 314.

In response to receiving the SIP NOTIFY/PUBLISH message in step 308, the backup B2BUA 122N sends a SIP INVITE with Replaces Header to reestablish the communication session to both the communication devices 101A and 101N in steps 316 and 318. The reason why the SIP INVITE with the Replaces Header is sent to both the communication devices 101A and 101N is because there are two dialogs that need to be established: 1) one between the communication device 101A and the backup B2BUA 122N, and 2) one between the backup B2BUA 122N and the communication device 101N. Based on the two SIP INVITE with replaces header messages of step 316 and 318, the communication session is reestablished between the communication devices 101A and 101N with the backup B2BUA 122N sequenced into the communication session in step 320. The media stream of step 302 is dropped and the media stream is then reestablished in step 322 (e.g., by using RTP/SDP).

To illustrate, consider the following example, the communication session is a voice communication session that has been established between the communication devices 101A and 101N (steps 300 and 302). The primary B2BUA 122A is a call security application that records the numbers of the parties on voice communication sessions. The primary B2BUA 122A is currently being used in 100 different active voice communication sessions. The primary B2BUA 122A fails in step 304. The session manager 120 determines that the primary B2BUA 122A has failed. As a result, the session manager 120 notifies the backup B2BUA 122N that it needs to reestablish all of the 100 active voice communication sessions. The backup B2BUA 122N starts this process. During this time, the session manager 120 receives a SIP OPTIONS message from the communication device 101A in step 306. At this point, the backup B2BUA 122N has only restored 10 of the 100 active communication sessions. The communication session between the communication device 101A and 101N has not been reestablished at this point.

The session manager 120 sends a SIP PUBLISH message of step 308 to the backup B2BUA 122N indicating to expedite the communication session between the communication devices 101A and 101N over any other communication sessions that need to be reestablished (i.e. the remaining 89 communication sessions who at this point have not received any in-dialog messages). In response to receiving the SIP PUBLISH message of step 308, the backup B2BUA 122N sends the 200 OK in step 312.

The session manager 120 sends a SIP 480 Temporarily Unavailable message to the communication device 101A to keep the communication device 101A from tearing down the communication session/media stream in step 310. The communication device 101A sends the SIP ACK in step 314.

To expedite the reestablishment of the communication session, the backup B2BUA 122N sends the SIP INVITE with Replaces Header in steps 316 and 318 to initiate the process of reestablishing the communication session between the communication devices 101A and 101N. The communication session is then reestablished in step 320. The media stream is of step 302 is dropped and then reestablished in step 322.

The process of sending the SIP NOTIFY/PUBLISH message to the backup B2BUA 122N and the backup B2BUA 122N sending the SIP INVITE with Replaces Header in steps 316 and 318 may be accomplished by the session reestablishment module 225. A backup B2BUA 122N registers with the session reestablishment module 225. Once the session manager 120 determines that the primary B2BUA has failed, the session manager sends the SIP NOTIFY/PUBLISH to the session reestablishment module 225. The session reestablishment module 225 then sends the SIP INVITE with Replaces Header of steps 316 and 318. The session reestablishment module 225 also notifies the backup B2BUA 122N so that the backup B2BUA can take over the session. This allows developers of sequenced applications 122 to leverage a common session reestablishment system 225 provided by the session manager 120.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A method comprising:
   determining, by a microprocessor, that a primary sequenced application has failed, wherein the primary sequenced application is sequenced into a first communication session between a first communication device and a second communication device;
   receiving, by the microprocessor, an in-dialog message for the first communication session; and in response to determining that the primary sequenced application has failed and receiving the in-dialog message for the first communication session, expediting, by the microprocessor, reestablishment of the first communication session to a backup sequenced application.

2. The method of claim 1, wherein the first communication device and the second communication device are communication endpoints and wherein the first communication session is expedited over a second communication session between other communication endpoints that also uses the primary sequenced application and wherein the second communication session has not received an in-dialog message since the primary sequenced application failed.

3. The method of claim 1, wherein the first communication session is a SIP communication session and wherein the in dialog-message for the first communication session is a SIP in-dialog message.

4. The method of claim 3, wherein the SIP in-dialog message for the first communication session is a SIP INVITE message from one of the first or second communication devices and expediting reestablishment of the first communication session to the backup sequenced application comprises: sending a SIP 491 Request Pending message in response to the SIP INVITE message.

5. The method of claim 3, wherein the SIP in-dialog message for the first communication session is a non SIP INVITE message and expediting reestablishment of the first communication session to the backup sequenced application comprises: sending a SIP 480 Temporarily Unavailable message in response to the non SIP INVITE message.

6. The method of claim 3, wherein expediting reestablishment of the first communication session to the backup sequenced application comprises: sending one of: a SIP 404 Not Found message, a SIP 413 Request Entity Too Large message, a SIP 486 Busy Here message, a SIP 600 Busy message, and a SIP 603 Decline message in response to the in-dialog message of the first communication session.

7. The method of claim 3, wherein expediting reestablishment of the first communication session further comprises: sending one of a SIP 480 Temporarily Unavailable message, a SIP 404 Not Found message, a SIP 413 Request Entity Too Large message, a SIP 486 Busy Here message, a SIP 600 Busy message, a SIP 603 Decline message, and a SIP 491 Request Pending message in response to the in-dialog message of the first communication session.

8. The method of claim 7, wherein expediting reestablishment of the first communication session comprises:
sending an SIP NOTIFY or a SIP PUBLISH message to the backup sequenced application, wherein the SIP NOTIFY or the SIP PUBLISH message instructs the backup sequenced application to reestablish the first communication session;
sending a SIP INVITE with Replaces Header to both the first communication device and the second communication; and
reestablishing the first communication session between the first communication device and the second communication device where the backup sequenced application is sequenced into the reestablished first communication session.

9. The method of claim 3, wherein the primary sequenced application and the backup sequenced application are Back-to-Back User Agents (B2BUA).

10. The method of claim 1, wherein the first communication session is a WebRTC communication session and wherein the in dialog-message for the first communication session is a WebRTC in-dialog message.

11. A system comprising:
a microprocessor; and
a computer readable medium, coupled with the microprocessor and comprising microprocessor readable and executable instructions that program the microprocessor to execute:
a session manager that determines that a primary sequenced application has failed, wherein the primary sequenced application is sequenced into a first communication session between a first communication device and a second communication device, receives an in-dialog message for the first communication session, and expedites reestablishment of the first communication session to a backup sequenced application in response to determining that the primary sequenced application has failed and receiving the in-dialog message for the first communication session.

12. The system of claim 11, wherein the first communication device and the second communication device are communication endpoints and wherein the first communication session is expedited over a second communication session between other communication endpoints that also uses the primary sequenced application and wherein the second communication session has not received an in-dialog message since the primary sequenced application failed.

13. The system of claim 11, wherein the first communication session is a SIP communication session and wherein the in dialog-message for the first communication session is a SIP in-dialog message.

14. The system of claim 13, wherein the SIP in-dialog message for the first communication session is a SIP INVITE message from one of the first or second communication devices and wherein the session manager expedites reestablishment of the first communication session to the backup sequenced application by sending a SIP 491 Request Pending message in response to the SIP INVITE message.

15. The system of claim 13, wherein the SIP in-dialog message for the first communication session is a non SIP INVITE message and wherein the session manager expedites reestablishment of the first communication session to the backup sequenced application by sending a SIP 480 Temporarily Unavailable message in response to the non SIP INVITE message.

16. The system of claim 13, wherein expediting reestablishment of the first communication session to the backup sequenced application comprises: sending one of a SIP 404 Not Found message, a SIP 413 Request Entity Too Large message, a SIP 486 Busy Here message, a SIP 600 Busy message, and a SIP 603 Decline message in response to the in-dialog message of the first communication session.

17. The system of claim 13, wherein expediting reestablishment of the first communication session comprises: sending one of a SIP 480 Temporarily Unavailable message, a SIP 404 Not Found message, a SIP 413 Request Entity Too Large message, a SIP 486 Busy Here message, a SIP 600 Busy message, a SIP 603 Decline message, and a SIP 491 Request Pending message in response to the in-dialog message of the first communication session.

18. The system of claim 17, wherein:
the session manager sends an SIP NOTIFY or a SIP PUBLISH message to the backup sequenced application, wherein the SIP NOTIFY or the SIP PUBLISH message instructs the backup sequenced application to reestablish the first communication session, and reestablishes the first communication session between the first communication device and the second communication device where the backup sequenced application is sequenced into the reestablished first communication session; and the backup sequenced application sends a SIP INVITE with Replaces Header to both the first communication device and the second communication device.

19. The system of claim 11, wherein the first communication session is a WebRTC communication session and wherein the in dialog-message for the first communication session is a WebRTC in-dialog message.

20. A computer program product comprising a non-transitory computer readable storage medium comprising:

instructions to determine that a primary sequenced application has failed, wherein the primary sequenced application is sequenced into a first communication session between a first communication device and a second communication device;

instructions to receive an in-dialog message for the first communication session; and in response to determining that the primary sequenced application has failed and receiving the in-dialog message for the first communication session, instructions to expedite reestablishment of the first communication session to a backup sequenced application.

* * * * *